United States Patent
Kanemoto et al.

(10) Patent No.: US 6,873,857 B1
(45) Date of Patent: Mar. 29, 2005

(54) BASE STATION APPARATUS AND TRANSMIT POWER CONTROL METHOD

(75) Inventors: Hideki Kanemoto, Yokosuka (JP); Osamu Kato, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 634 days.

(21) Appl. No.: 09/868,861

(22) PCT Filed: Oct. 24, 2000

(86) PCT No.: PCT/JP00/07424
§ 371 (c)(1),
(2), (4) Date: Jun. 21, 2001

(87) PCT Pub. No.: WO01/33877
PCT Pub. Date: May 10, 2001

(30) Foreign Application Priority Data

Oct. 29, 1999 (JP) .......................... 11-308077

(51) Int. Cl.[7] ............................... H04B 7/00
(52) U.S. Cl. .................. 455/522; 455/69; 455/436; 455/442; 370/318; 370/331; 370/332
(58) Field of Search .................. 455/69, 436, 442, 455/522, 441, 67.11; 370/318, 331, 332, 342; 375/340

(56) References Cited

U.S. PATENT DOCUMENTS 6,404,826 B1 * 6/2002 Schmidl et al. ............. 375/340
6,405,021 B1 * 6/2002 Hamabe ...................... 455/69

FOREIGN PATENT DOCUMENTS

| JP | 7235902 | 9/1995 |
| JP | 1013364 | 1/1998 |
| JP | 2000252918 | 9/2000 |
| KR | 20010019655 | 3/2001 |

OTHER PUBLICATIONS

Korean Office Action dated Apr. 18, 2003 with English translation.

* cited by examiner

*Primary Examiner*—Nay Maung
*Assistant Examiner*—Raymond Dean
(74) *Attorney, Agent, or Firm*—Stevens, Davis, Miller & Mosher, LLP

(57) ABSTRACT

Reception SIR calculation section 107 calculates a reception SIR using a value obtained by averaging interference signal power over several immediately preceding consecutive slots. Reference value decision section 109 decides whether the reception SIR is greater than a reference value or not. In the case where the count of desired signal power stored in power value storage section 108 satisfies a count necessary for averaging and at the same time the reception SIR is not greater than the reference value, TPC creation section 110 creates a TPC to instruct a decrease of transmit power and creates a TPC to instruct an increase of transmit power otherwise. This allows the base station to constantly receive signals of sufficient quality and perform efficient communications.

10 Claims, 5 Drawing Sheets

BASE STATION APPARATUS AND TRANSMIT POWER CONTROL METHOD

TECHNICAL FIELD

The present invention relates to a base station apparatus and transmit power control method used in a mobile radio communication system such as a cellular telephone and automobile telephone.

BACKGROUND ART

FIG. 1 is a drawing to outline handover that takes place in a mobile radio communication cellular system. In FIG. 1, mobile station 11 is currently carrying out radio communication with base station 31 installed in cell 21 and moving toward cell 22 adjacent to cell 21.

When mobile station 11 moves from cell 21 to cell 22, mobile station 11 carries out diversity handover between base station 31 and base station 32. During the diversity handover, mobile station 11 measures the reception quality of a common control channel by communicating with both base station 31 and base station 32. Then, when the reception quality of base station 32 becomes better than that of base station 31, mobile station 11 switches its communication counterpart from base station 31 to base station 32.

Furthermore, during the diversity handover, control station 41 selects and combines signals with good reception conditions from among signals sent from mobile station 11 and received by base station 31 and base station 32.

Here, in a cellular system, closed-loop transmit power control is performed between the mobile station and base stations to improve the frequency utilization efficiency by reducing interference with other communication stations. Transmit power control by the base stations is carried out by referring to the reception quality such as a reception SIR (signal to interference ratio) and the error rate of the signal sent from the mobile station, generating information to control the transmit power of the mobile station (Transmit-Power Control: hereinafter referred to as "TPC") so that the reception quality satisfies a certain standard and sending the TPC to the mobile station.

Transmit power control using the reception SIR by the base stations is carried out by receiving an individual channel sent from the mobile station subject to the transmit power control and calculating the ratio of the power of the desired signal to the other reception power, that is, the power of the interference signal.

It is a general practice that an average power value over several slots or frames instead of an instantaneous value is used as the interference signal power value and this is disclosed in the Unexamined Japanese Patent Publication No.HEI 10-13364.

During diversity handover, transmit power control is performed simultaneously between mobile station 11 and base stations 31 and 32, and mobile station 11 acquires TPCs sent from base stations 31 and 32 and carries out transmit power control of the own station based on those TPCs.

Since the reception signals of base stations 31 and 32 are selected and combined by control station 41, not all base stations in communication need to satisfy the reception quality standard and mobile station 11 determines transmit power according to the TPC with minimum transmit signal power of a plurality of TPCs received.

However, when diversity handover starts, that is, when the mobile station starts communication with a new base station in addition to the base station currently in communication, the base station that newly enters into communication has no sufficiently observed individual channels, which are to be used for measurement of the SIR of the mobile station and to be averaged, and therefore averaging causes the power of the signal of interference with the mobile station to be measured lower than the actual value.

Therefore, the base station that has newly entered into communication determines that the reception SIR of the mobile station is satisfactory and transmits a TPC instructing the mobile station to reduce its transmit power.

Even if the mobile station receives from the base station currently in communication a TPC instructing that the transmit power should be increased, the mobile station receives from the base station that has newly entered into communication the TPC instructing that the transmit power should be reduced, and therefore the mobile station reduces transmit power according to the TPC instructing the minimum transmit signal power even if the reception SIR is actually not satisfactory for the base station currently in communication.

For this reason, the reception quality further deteriorates and satisfactory reception quality is not obtained from either of the base stations involved in the diversity handover, which prevents the control station from combining the reception signals. As a result, it will be necessary to retransmit the transmission unit, causing problems of reducing the communication efficiency and interrupting radio connections.

DISCLOSURE OF INVENTION

It is an object of the present invention to provide a base station apparatus and transmit power control method capable of constantly receiving signals of sufficient quality and performing efficient communication during handover.

This object is achieved, when transmit power control is performed with a mobile station with which a radio connection has been newly established, by not performing control to reduce transmit power on the relevant mobile station until the power of the interference signal against the signal sent from the relevant mobile station can be measured appropriately.

BEST MODE FOR CARRYING OUT THE INVENTION

With reference now to the attached drawings, embodiments of the present invention will be explained in detail below.

(Embodiment 1)

Figure 1:
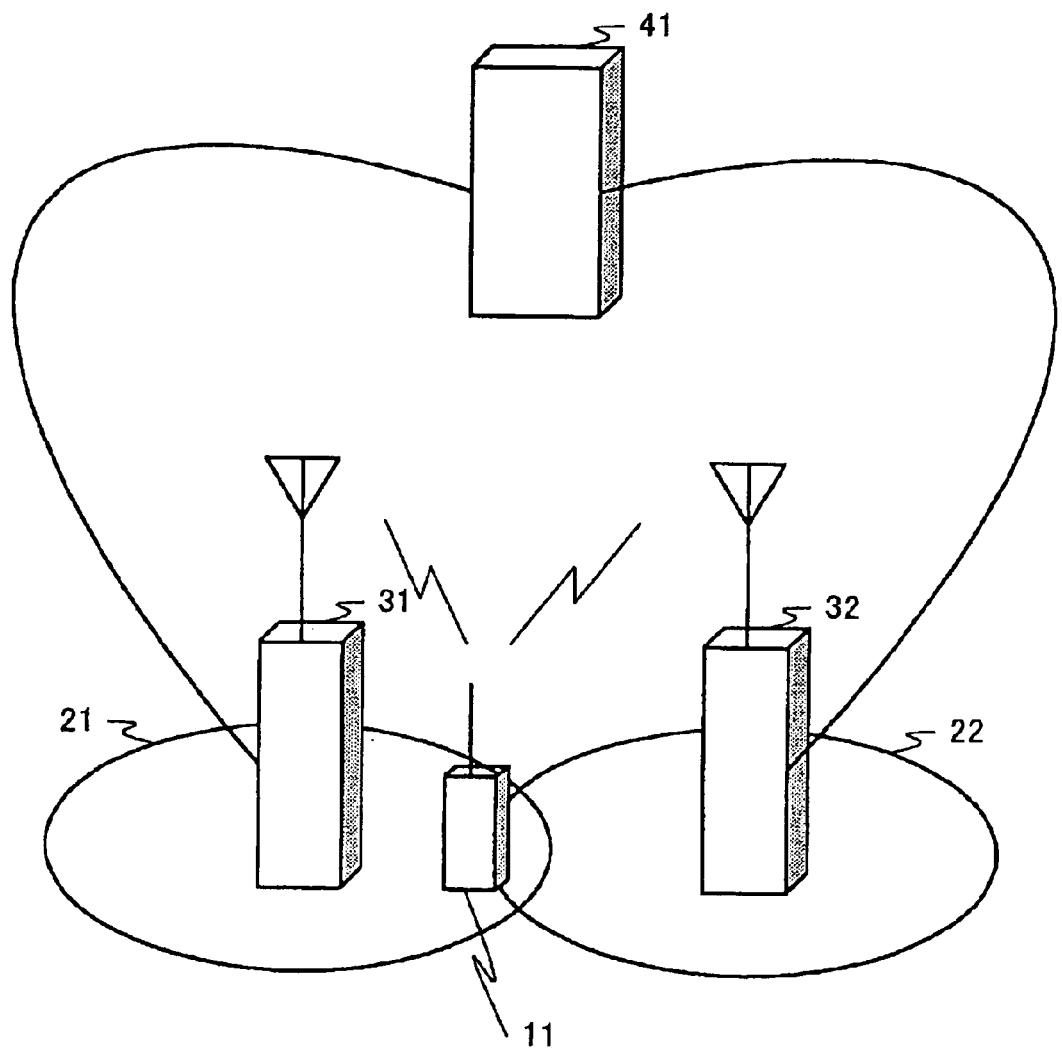
FIG. 1 is a drawing to outline handover in a mobile radio communication cellular system.
Figure 2:
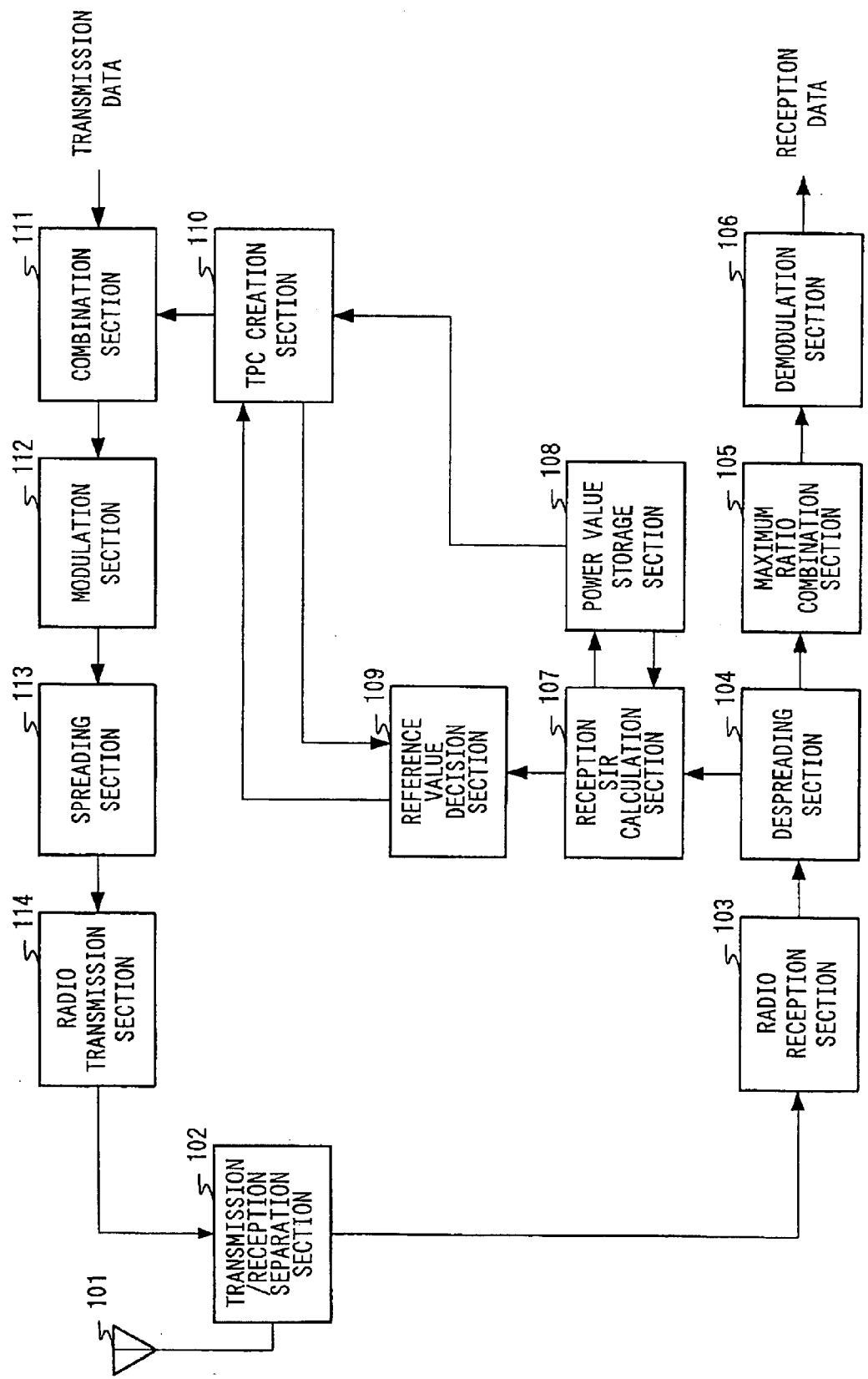
FIG. 2 is a block diagram showing a configuration of a base station according to Embodiment 1 of the present invention.

FIG. 2 is a block diagram showing a configuration of a base station according to Embodiment 1 of the present invention.

A signal sent from a mobile station with which the base station is communicating is received by antenna 101 and input to radio reception section 103 via transmission/reception separation section 102. Radio reception section 103 performs radio processing such as amplification and frequency conversion on the reception signal input. Despreading section 104 multiplies the output signal from radio reception section 103 by a spreading code specific to each mobile station.

Maximum ratio combination section 105 combines the output signal from despreading section 104 at a maximum ratio. Demodulation section 106 demodulates the output signal of maximum ratio combination section 105 and extracts the reception data.

Reception SIR calculation section 107 measures the desired signal power and interference signal power from the output signal of despreading section 104, calculates an average value of new interference signal power using the average value of the interference signal power stored so far in power value storage section 108 and calculates a reception SIR from the ratio of the desired signal power to interference signal power. Specific examples of measurements of the desired signal power, interference signal power and averaging thereof-will be described later.

Power value storage section 108 stores the count of interference signal power measured so far by reception SIR calculation section 107 and the average value of the interference signal power calculated by reception SIR calculation section 107.

Reference value decision section 109 decides whether the reception SIR calculated by reception SIR calculation section 107 is greater than a reference value or not and notifies TPC creation section 110 of the decision result.

When the count of the interference signal power stored in power value storage section 108 is smaller than the count necessary to perform averaging processing in reception SIR calculation section 107 (hereinafter referred to as "averaging count"), that is, until the interference signal power against the signal sent from the relevant mobile station can be correctly estimated, TPC creation section 110 creates a TPC instructing an increase of transmit power irrespective of the decision result notified from reference value decision section 109. Furthermore, when the count of the interference signal power stored in power value storage section 108 satisfies the averaging count, TPC creation section 110 creates a TPC instructing a decrease of transmit power in the case where the reception SIR is greater than the reference value and creates a TPC instructing an increase of transmit power in the case where the reception SIR is equal to or smaller than the reference value based on the decision result notified from reference value decision section 109.

Combination section 111 combines the TPCs output from TPC creation section 110 with transmission data and forms a frame according to a transmission data format.

Modulation section 112 performs primary modulation processing such as PSK and QPSK on the output signal of combination section 111. Spreading section 113 multiplies the output signal of modulation section 112 by a specific spreading code. Radio transmission section 114 performs radio processing such as amplification and frequency conversion on the output signal of spreading section 113 and transmits the signal from antenna 101 via transmission/reception separation section 102.

The mobile station that has received the signal carrying TPC from the base station increases the transmit power value by a predetermined quantity (e.g., 1 dB) from the previous transmit power value if the extracted TPC instructs an increase of transmit power and decreases the transmit power value by a predetermined quantity (e.g. 1 dB) from the previous transmit power value if the extracted TPC instructs a decrease of transmit power.

Then, specific examples of measurements of desired signal power and interference signal power of reception SIR calculation section 107 and averaging thereof will be explained.

First, reception SIR calculation section 107 detects and extracts the positions of pilot symbols in a reception slot, that is, known symbols and corrects the quadrant of the despread value, that is, removes the modulated components of 0 or 1.

Then, reception SIR calculation section 107 calculates desired signal power RSSI and interference signal power ISSI in the actual slot as follows.

With respect to the pth path in a P path, average value $rssi[p] \cdot i$ of an in-phase component and average value $rssi[p] \cdot q$ of a quadrature component for every slot in N pilot symbols after quadrant correction are calculated from following expressions (1).

$$rssi[p] \cdot i = \frac{1}{N} \sum_{n=1}^{N} Sx[n][p] \cdot i \qquad (1)$$

$$rssi[p] \cdot q = \frac{1}{N} \sum_{n=1}^{N} Sx[n][p] \cdot q$$

Then, desired signal power $rssi[p]$ for every slot and every path is calculated from following expression (2).

$$rssi[p] = rssi[p] \cdot i^2 + rssi[p] \cdot q^2 \qquad (2)$$

Overall desired signal power RSSI is calculated from following expression (3) as a sum of desired signal power for every path.

$$RSSI = \sum_{p=1}^{P} rssi[p] \qquad (3)$$

The in-phase component $issi[n][p] \cdot i$ and quadrature component $issi[n][p] \cdot q$ of the interference signal are calculated from following expressions (4) from a difference between pilot symbols after a quadrant correction and its average for every slot.

$$issi[n][p] \cdot i = Sx[n][p] \cdot i - rssi[p] \cdot i$$

$$issi[n][p] \cdot q = Sx[n][p] \cdot q - rssi[p] \cdot q \qquad (4)$$

From this, interference signal power $issi[p]$ for every slot and every path is calculated from following expression (5).

$$issi[p] = \frac{1}{N} \sum_{n=1}^{N} (issi[n][p] \cdot i^2 + issi[n][p] \cdot q^2) \qquad (5)$$

Then, overall interference signal power ISSI is calculated as an average value for every path from following expression (6).

$$ISSI = \frac{1}{P}\sum_{p=1}^{P} issi[p] \tag{6}$$

Then, reception SIR calculation section 107 averages interference signal power ISSI over a plurality of slots using an IIR filter as shown in following expression (7).

$$ISSI_{ave} = \alpha_{ave\_previous} + (1-\alpha) \cdot ISSI \tag{7}$$

Here, $ISSI_{ave\_previous}$ is the averaging interference signal power calculated in the immediately preceding slot and α is called a "forgetting factor" and a value such as 0.99 is set. In this case, weight 1−0.99, that is, 0.01 is assigned to the interference signal power ISSI calculated in the current slot and since it is very small compared to the weight 0.99 related to the averaged interference signal power $ISSI_{ave\_previous}$ as calculated in the previous slot, it is not until measurement and averaging have been performed approximately 100 times that reliable averaging interference signal power is measured.

Figure 3:
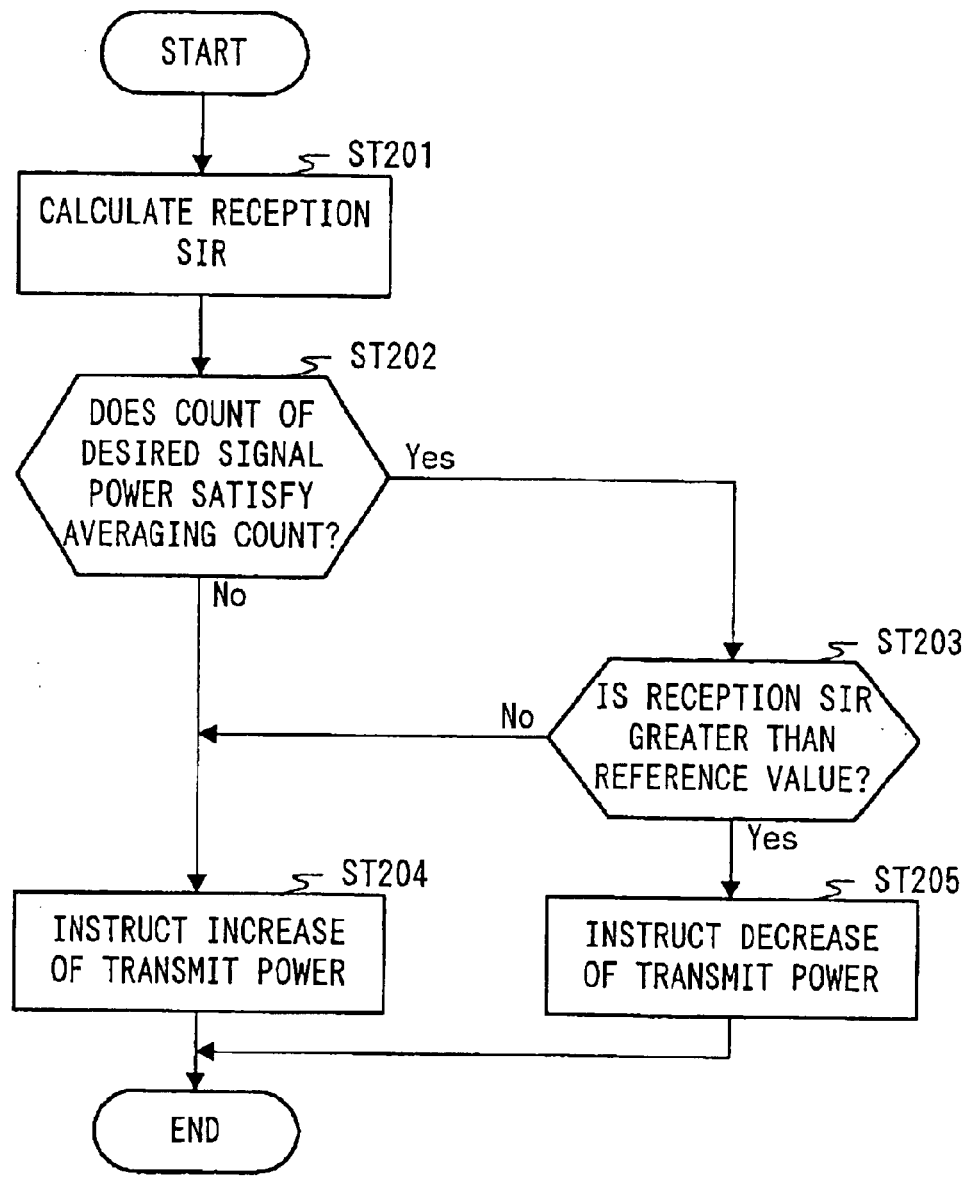
FIG. 3 is a flow chart showing a TPC creation method based on a reception SIR of the base station according to Embodiment 1 of the present invention.

Then, the TPC creation method based on the reception SIR of the base station shown in FIG. 2 will be explained using the flow chart in FIG. 3.

First, in step (hereinafter abbreviated as "ST") 201, reception SIR calculation section 107 calculates a reception SIR based on the measured desired signal power and interference signal power, and the averaged value of the interference signal power stored in power value storage section 108.

Then, in ST202, TPC creation section 110 decides whether the count of interference signal power stored in power value storage section 108 satisfies the averaging count or not.

In the case where the count of interference signal power satisfies the averaging count in ST202, reference value decision section 109 compares the level of the reception SIR with a predetermined reference value in ST203.

Then, in the case where the count of interference signal power does not satisfy the averaging count in ST202 or the reception SIR is equal to or smaller than the reference value in ST203, TPC creation section 110 creates a TPC to instruct an increase of transmit power in ST204.

On the other hand, in the case where the reception SIR is greater than the reference value in ST203, TPC creation section 110 creates a TPC to instruct a decrease of transmit power in ST205.

In this way, the base station instructs a mobile station with which to establish a new radio link to increase transmit power irrespective of the calculated reception SIR until the base station can correctly estimate the interference signal power against a signal sent from the relevant mobile station, thus preventing the base station from instructing a decrease of transmit power by overestimating the reception SIR, and thereby allowing the base station to always receive signals of sufficient quality and perform efficient communications.

Moreover, after successful estimation of the interference signal power against the signal sent from the mobile station with which a new radio connection has been established, the base station can perform correct transmit power control on the relevant mobile station.

(Embodiment 2)

Figure 4:
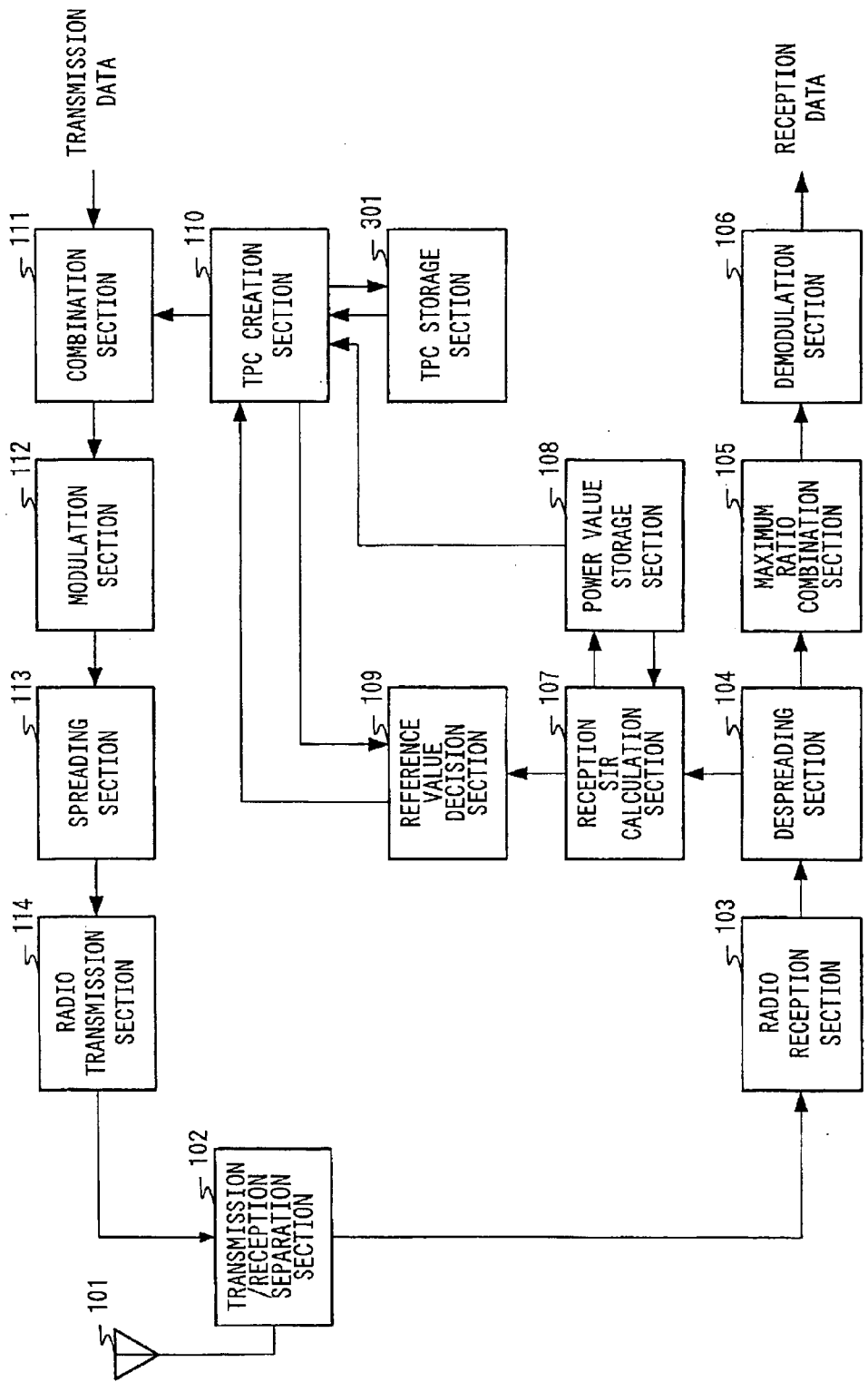
FIG. 4 is a block diagram showing a configuration of a base station according to Embodiment 2 of the present invention.

FIG. 4 is a block diagram showing a configuration of a base station according to Embodiment 2 of the present invention. In the base station shown in FIG. 4, the parts having a configuration and operation common to those of the base station according to Embodiment 1 shown in FIG. 2 are assigned the same reference numerals as those in FIG. 2 and explanations thereof are omitted.

The base station shown in FIG. 4 has a configuration with TPC storage section 301 added to the base station shown in FIG. 2.

TPC storage section 301 stores only one TPC input from TPC creation section 110 and updates the storage content every time a TPC is input. That is, TPC storage section 301 stores only the previous TPC.

TPC creation section 110 outputs the created TPC to the combination section 111 and TPC storage section 301. Furthermore, when the count of the interference signal power stored in power value storage section 108 is smaller than the averaging count, TPC creation section 110 reads the previous TPC stored in TPC storage section 301 and creates a TPC whose content is opposite to that of the previous TPC.

Figure 5:
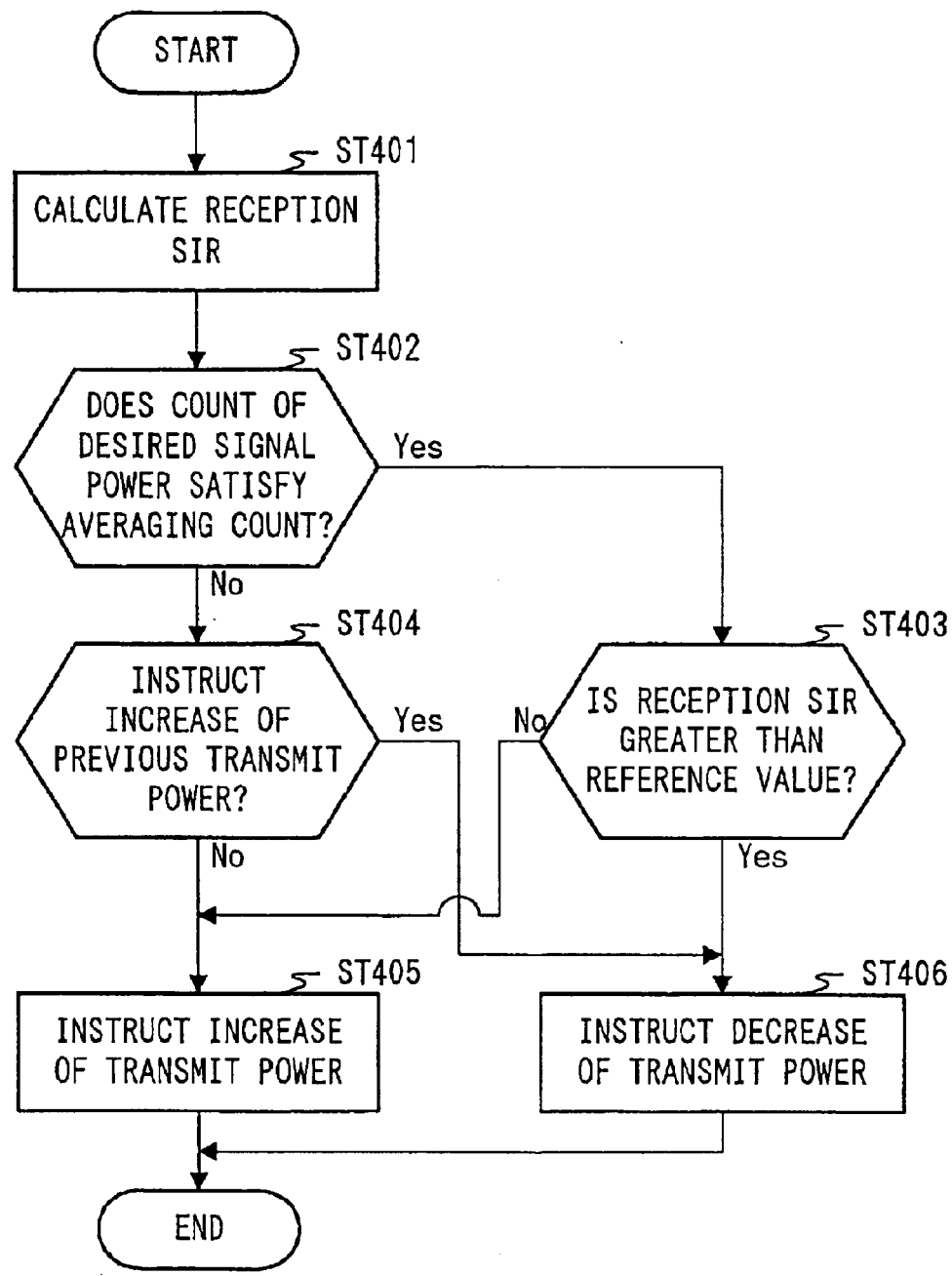
FIG. 5 is a flow chart showing a TPC creation method based on a reception SIR of the base station according to Embodiment 2 of the present invention.

Then, the TPC creation method based on the reception SIR of the base station shown in FIG. 4 will be explained using the flow chart in FIG. 5.

First in ST401, reception SIR calculation section 107 calculates a reception SIR based on the measured desired signal power and interference signal power, and the average value of interference signal power stored in power value storage section 108.

Then, in ST402, TPC creation section 110 decides whether the count of interference signal power stored in power value storage section 108 satisfies the averaging count or not.

In the case where the count of desired signal power satisfies the averaging count in ST402, reference value decision section 109 compares the level of the reception SIR with a preset reference value in ST403.

On the other hand, in the case where the count of interference signal power does not satisfy the averaging count in ST402, TPC creation section 110 decides the content of the previous TPC stored in TPC storage section 301 in ST404.

In the case where the reception SIR is equal to or smaller than the reference value in ST403 or the content of the previous TPC instructs a decrease of transmit power in ST404, TPC creation section 110 creates a TPC instructing an increase of transmit power in ST405.

On the other hand, in the case where the reception SIR is greater than the reference value in ST403 or the content of the previous TPC instructs an increase of transmit power in ST404, TPC creation section 110 creates a TPC instructing a decrease of transmit power in ST406.

Thus, in the case where the measured count of interference signal power does not satisfy the count necessary for averaging, this embodiment creates a TPC taking into account the previously created TPC and the mobile station continues to increase transmit power in addition to the effect of Embodiment 1, and can thereby prevent interference from other mobile stations from increasing.

By the way, Embodiment 2 above describes the case where the measured count of interference signal power does not satisfy the count necessary for averaging or an increase and decrease of transmit power are instructed alternately, but the present invention is not limited to this and can be implemented as far as the rate of instructing an increase of transmit power does not fall below the rate of instructing a decrease of transmit power, for example, instructing a decrease of transmit power after instructing an increase of transmit power two consecutive times.

Furthermore, the embodiments above can also be configured in such a way that measurement of interference signal power is started for a mobile station with which to establish a new radio connection. In this case, correct transmit power control can be performed on the mobile station when the connection is established.

Furthermore, the reception SIR calculation system of the present invention is not necessarily limited to a system of averaging over several immediately preceding consecutive slot times. That is, the present invention can produce effects similar to those of the embodiments above by some time averaging over several slots, which may not be several immediately preceding slots or may be several non-consecutive slots, if the reception SIR calculation system is at least a system of calculating a more accurate reception SIR.

As is apparent from the explanations above, the base station apparatus and transmit power control method of the present invention can perform transmit power control so that the transmit power of the relevant mobile station does not decrease during handover until interference signal power is correctly measured, allowing the base station to constantly receive signals of sufficient quality, and realize efficient communications.

This application is based on the Japanese Patent Application No.HEI 11-308077 filed on Oct. 29, 1999, entire content of which is expressly incorporated by reference herein.

INDUSTRIAL APPLICABILITY

The present invention is ideally applicable to a mobile radio communication system such as a cellular telephone and automobile telephone.

What is claimed is:

1. A base station apparatus comprising:
a signal to interference ratio calculator that calculates a signal to interference ratio using a value obtained by averaging interference signal power for several slot times;
a reference value decider that decides whether the calculated signal to interference ratio is greater than a reference value or not; and
a transmit power control information creator that creates transmit power control information to instruct either an increase or decrease of transmit power based on the number of slots used to calculate the averaged interference signal power and the decision result of said reference value decider, wherein:
when the number of slots used to calculate the averaged interference signal power equals or exceeds a predetermined number, the transmit power control information creator creates the transmit power control information based on the decision result of the reference value decider, and
when the number of slots used to calculate the averaged interference signal power is less than the predetermined number, regardless of the decision result of the reference value decider, the transmit power control information creator creates the transmit power control information so as not to allow a transmit power level to fall below a predetermined level.

2. The base station apparatus according to claim 1, wherein when the number of slots used to calculate the averaged interference signal power is less than the predetermined number, the transmit power control information creator creates the transmit power control information instructing an increase of the transmit power.

3. The base station apparatus according to claim 1, wherein when the number of slots used to calculate the averaged interference signal power is less than the predetermined number, the transmit power control information creator creates the transmit power control information so that a count of transmit power control information instructing an increase of the transmit power created so far does not fall below a count of transmit power control information instructing a decrease of the transmit power.

4. The base station apparatus according to claim 1, wherein when the number of slots used to calculate the averaged interference signal power is less than the predetermined number, the transmit power control information creator creates transmit power control information whose content is opposite to that of the immediately preceding transmit power control information.

5. The base station apparatus according to claim 1, wherein when the number of slots used to calculate the averaged interference signal power equals or exceeds the predetermined number, the transmit power control information creator creates transmit power control information instructing a decrease of the transmit power when the signal to interference ratio is greater than the reference value and creates transmit power control information instructing an increase of the transmit power when the signal to interference ratio is equal to or smaller than the reference value.

6. The base station apparatus according to claim 1, wherein the signal to interference ratio calculator starts to measure interference signal power for a communication terminal apparatus with which to establish a new radio connection prior to starting control of uplink transmit power of the communication terminal apparatus based on the transmit power control information that is inserted into the downlink.

7. A closed loop transmit power control method whereby a base station apparatus transmits transmit power control information to a communication terminal apparatus and the communication terminal apparatus sets transmit power based on the transmit power control information, the method comprising having the base station apparatus create transmit power control information instructing an increase of transmit power until the base station apparatus can correctly estimate interference signal power against a signal sent from a communication terminal apparatus with which a new radio connection has been established.

8. The transmit power control method according to claim 7, wherein the base station apparatus starts to measure interference signal power in advance for the communication terminal apparatus with which to establish the new radio connection.

9. A closed loop transmit power control method whereby a base station apparatus transmits transmit power control information to a communication terminal apparatus and the communication terminal apparatus sets transmit power based on the transmit power control information, the method comprising having the base station apparatus create transmit power control information so that a count of the transmit power control information instructing an increase of transmit power created so far does not fall below a count of the transmit power control information instructing a decrease of transmit power, until the base station apparatus can correctly estimate interference signal power against a signal sent from a communication terminal apparatus with which a new radio connection has been established.

10. A closed loop transmit power control method whereby a base station apparatus transmits transmit power control information to a communication terminal apparatus and the communication terminal apparatus sets transmit power based on the transmit power control information, the method comprising having the base station apparatus create transmit power control information whose content is opposite to that of an immediately preceding transmit power control information, until the base station apparatus can correctly estimate interference signal power against a signal sent from a communication terminal apparatus with which a new radio connection has been established.

* * * * *